US007247219B2

(12) United States Patent
O'Dowd

(10) Patent No.: US 7,247,219 B2
(45) Date of Patent: Jul. 24, 2007

(54) ROTARY IMPULSE SEALER

(75) Inventor: Robert J. O'Dowd, Wesley Hills, NY (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 448 days.

(21) Appl. No.: 10/890,952

(22) Filed: Jul. 14, 2004

(65) Prior Publication Data

US 2006/0011291 A1 Jan. 19, 2006

(51) Int. Cl.
*B27G 11/02* (2006.01)
*H05B 3/02* (2006.01)

(52) U.S. Cl. .................................... 156/380.2; 219/244

(58) Field of Classification Search ............. 156/583.1, 156/583, 380.2, 308.2, 166; 219/244; 53/568
See application file for complete search history.

(56) References Cited

U.S. PATENT DOCUMENTS

| | | | |
|---|---|---|---|
| 2,127,183 A | 8/1938 | Moore | |
| 2,556,008 A | 6/1951 | Spalding | |
| 2,794,485 A | 6/1957 | Ashton et al. | |
| 3,142,602 A | 7/1964 | Shabram | |
| 3,153,607 A | 10/1964 | Ambler | |
| 3,221,613 A | 12/1965 | Sanders | |
| 3,557,325 A * | 1/1971 | Hansen | 200/19.07 |
| 3,616,095 A | 10/1971 | Membrino | |
| 3,767,508 A | 10/1973 | Hawkins et al. | |
| 3,950,205 A * | 4/1976 | Hawkins et al. | 156/251 |
| 4,055,456 A | 10/1977 | Carnegie, Jr. | |
| 4,105,491 A | 8/1978 | Haase et al. | |
| 4,302,276 A | 11/1981 | Schulze | |
| 4,464,219 A | 8/1984 | Colombo et al. | |
| 4,509,820 A | 4/1985 | Murata et al. | |
| 4,579,516 A | 4/1986 | Caputo | |
| 4,872,942 A * | 10/1989 | Sharps et al. | 156/515 |
| 5,246,527 A * | 9/1993 | Bjorkman et al. | 156/459 |
| 5,355,656 A | 10/1994 | Perrett | |
| 5,376,219 A | 12/1994 | Sperry et al. | |
| 5,411,625 A | 5/1995 | Focke et al. | |

(Continued)

FOREIGN PATENT DOCUMENTS

| | | |
|---|---|---|
| GB | 669 004 | 3/1952 |
| JP | 48 046673 | 7/1973 |
| JP | 8-270641 | 10/1986 |

OTHER PUBLICATIONS

Search Report for EP 05254257.8 dated Dec. 22, 2006.
Warner, The Carbon Commutator The Future Of Electric Motors, Joyal Products, Inc., pp. 1-13.
Brody, et al., The Wiley Encyclopedia of Packaging Technology, Second Ed.

*Primary Examiner*—Richard Crispino
*Assistant Examiner*—Pedram Parvini
(74) *Attorney, Agent, or Firm*—Alston & Bird LLP

(57) ABSTRACT

The invention is a rotatable cylindrical roll for heat sealing heat sealable materials that includes a heating zone for sealing the material and a cooling zone for supporting the newly formed seal. The device comprises a conductive zone and a resistive zone that are in electrical communication. The resistive zone comprises a cylindrical member having a circumferential band of resistive material disposed on its surface. The conductive zone comprises a cylindrical member having a plurality of conductive strips extending laterally across its surface that are in electrical communication with the resistive band. Current is applied via a brush to the conductive strips. Current flows from the conductive strips into the resistive band and exits through a conductive strip that is in contact with a ground. Current path through the resistive band defines the heating zone, and the cooling zone is defined by area of the resistant band outside the heating zone.

36 Claims, 8 Drawing Sheets

10
25
35
30
15
20
32
19
10
30
17
32
15

U.S. PATENT DOCUMENTS 6,032,712 A 3/2000 Biagiotti
6,282,869 B1 9/2001 Bullock et al.
6,405,779 B1 6/2002 Wittkopf
6,537,414 B1 * 3/2003 Schoelling ............... 156/308.2
6,550,229 B2 4/2003 Sperry et al.
6,657,165 B1 * 12/2003 Makutonin et al. ......... 219/244
6,719,867 B1 4/2004 Mileti et al.
6,822,203 B2 * 11/2004 Hayward .................... 219/512
2001/0003336 A1 6/2001 Abbott et al.
2003/0000934 A1 1/2003 Tanaka et al.
2003/0037858 A1 2/2003 Kannankeril et al.
2004/0126647 A1 * 7/2004 Jones .......................... 429/57

* cited by examiner

ROTARY IMPULSE SEALER

BACKGROUND OF THE INVENTION

The invention relates generally to heat seal devices and more particularly to impulse heat seal devices.

Flexible packaging products are used to protect a wide variety of articles from both physical abuse and contamination. These packaging products include, for example, plastic bags or pouches that can be useful for packaging items such as food, and cushion materials such as air cellular material.

Flexible packaging can be prepared from sheets of laminates or films that are bonded together to form a desired product. The packaging may include thermoplastic materials that can be bonded together using a heat seal. A heat seal is produced by applying heat to the thermoplastic materials until they melt together and effectively fuse to form a seal. In many circumstances it may be desirable to bond two sheets of thermoplastic material together to form a continuous running seal. It may be difficult to use heat to fuse unsupported materials together to form a continuous running seal because the materials may melt and stick to the heating element or the seal may separate when it is no longer supported by the heating element.

One technique for producing a continuous running seal includes passing the thermoplastic materials that are to be fused together over a heated drum. Typically, the entire surface of the drum is heated via an interior resistor wire or hot fluid. As the materials pass over the surface of the drum, the heat fuses the films together. If the newly sealed films leave the drum still heated, the seal will not have cooled sufficiently to produce a strong bond and the seal can separate or tear. As a result, these devices typically require the presence of a Teflon belt between the films and the drum. The Teflon belt prevents the film from adhering to the drum and provides additional support for the newly formed seal after it has left the drum.

In another technique, a continuous seal can be made by passing the thermoplastic materials between heated rollers. A disadvantage associated with this method is that the dwell time for heat sealing between the rollers is extremely short. Typically, good seals can be made only if the rollers are moving very slowly or if the materials are preheated before passing through the heated rollers. Additionally, the newly formed seal may tear or rupture if the fused materials are not adequately supported after passing between the rollers.

Impulse sealing is another commonly used method to produce a continuous seal. In one form of impulse sealing, the materials are indexed forward between opposed sealing jaws. An electrically resistive material, such as nichrome resistive wire is positioned within one of the jaws and covered with an electrically insulating layer. The thermoplastic materials are indexed forward between the jaws and an electric current is passed through the resistive wire to fuse the materials. After the current turns off, the transfer of heat from the thermoplastic materials to the jaws facilitates faster cooling and solidification of the newly formed seal. The jaws are then opened and the fused materials are indexed forward to produce the next seal. The advantage of this method is that the seal is cooled to achieve adequate strength before the jaws are opened. The disadvantage of this system is that it requires more time and the materials cannot be continuously moved forward in a seamless manner.

Thus, there still exists a need to provide a device and method for producing a continuous heat seal in heat sealable materials that provides adequate heating for producing the seal while at the same time supporting the newly formed seal until it is adequately cooled.

BRIEF SUMMARY OF THE INVENTION

The invention is a device for performing a heat seal that overcomes many of the disadvantages associated with prior techniques. The device, also referred to as a rotary impulse sealer, is in the form of a cylindrical roll having an adjustably fixed heating zone for producing a continuous running seal and a cooling zone defined by the area of the roll outside the heating zone for supporting the newly sealed materials.

The rotary impulse sealer comprises a generally cylindrical roll having an electrically resistive zone and an electrically conductive zone. The electrically resistive zone comprises a resistive member having a circumferential band of electrically resistive material that acts as a heating element to produce heat sealing temperatures. The electrically conductive zone typically comprises a cylindrical conductive member having a plurality of conducting strips extending laterally across its surface. The conducting strips are normally electrically insulated from each other and are individually in electrical communication with the resistive band. The sealer may be either motor or product driven.

Electric current is applied to the conductive zone and flows to a corresponding electrically resistive zone that is in electrical communication with the conductive zone. The source of the electrical current is normally fixed relative to the rotation of the roll so that a "hot zone" is created that does not change with respect to the rotation of the rotary impulse sealer. The rotary impulse sealer in some embodiments includes an electric contact and a ground contact that are typically each in electrical and mechanical communication with a conductive strip. As a result, a current pathway can be created whereby current can flow from the electric contact through a conductive strip and into the resistive band. The current can then flow through the resistive band and exit into a conductive strip that is in electrical communication with the ground contact. The hot zone is defined by the current pathway through the resistive band. The size of the hot zone can be increased or decreased by changing the position of either the electric contact or the ground contact with respect to each other. The cooling zone is defined by the portion of the band that is outside of the current pathway. Changing the size of the hot zone changes the dwell time that the heat sealable material contacts the heating zone, and allows the surface area of the resistive band to be adjusted to achieve optimal conditions for heat sealing, supporting, and cooling of heat sealable materials.

In an alternate embodiment, the rotary impulse sealer can be used to produce transverse heat seals. In one embodiment, an electrically resistive zone is in communication with two electrically conductive zones. The resistive zone comprises a generally cylindrical resistive member having a plurality of electrically resistive strips extending laterally across its surface. The electric contact and ground contact are disposed on separate conductive zones and are each in mechanical and electrical communication with a conductive strip. In this embodiment, current flows from the electric contact and into a resistive strip, thereby creating a heating zone that extends laterally across the surface of the resistive member. The current then passes from the resistive strip to the ground contact. The size and quantity of the resistive strips can be varied to change the width of the resulting heat seal and the distance between successive heat seals.

Thus, the invention is a rotary impulse sealer that provides a roll or drum having a plurality of zones for supporting and cooling the heat seals and individual hot zone on the roll defined by select activated conductive strips adjacent the cooling zone for creating the seals, either longitudinally or transversely.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1*a* is a front view of a rotary impulse sealer depicting two sheets of heat sealable material traveling over the sealer;

FIG. 1*b* is a side view of the rotary impulse sealer depicted in FIG. 1;

Figure 5A:
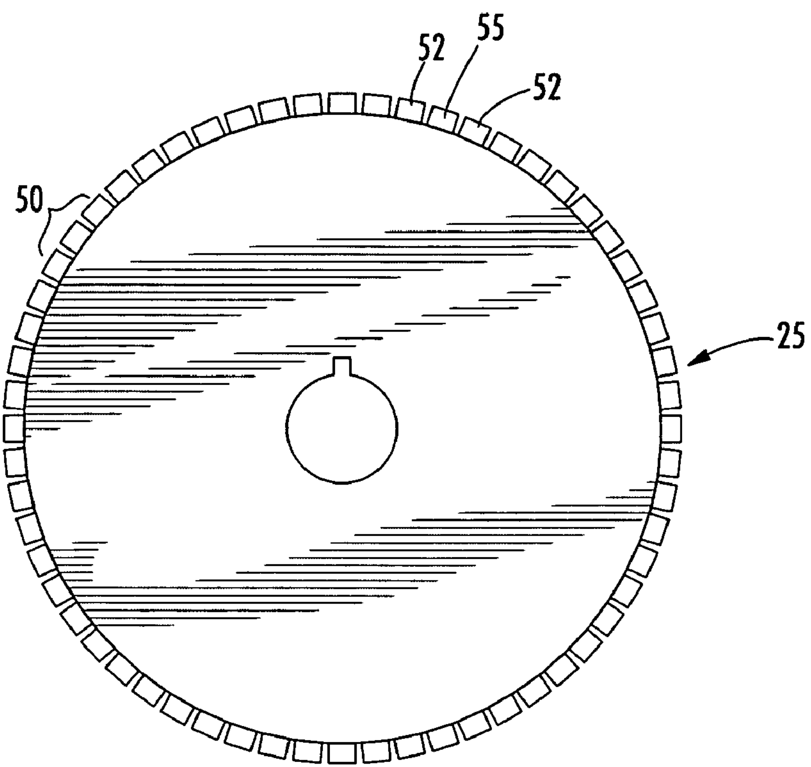
Figure 5B:
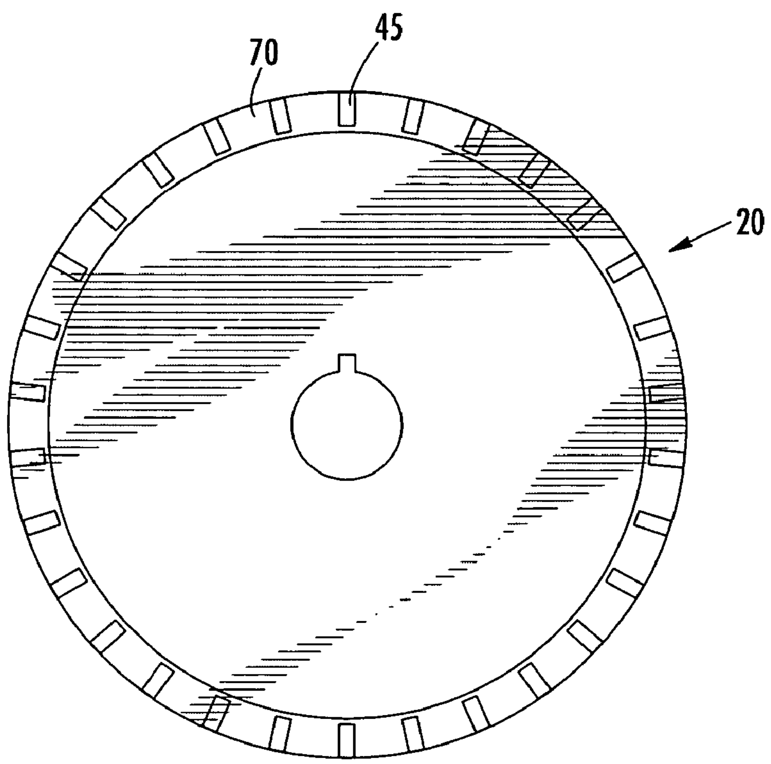
Figure 5C:
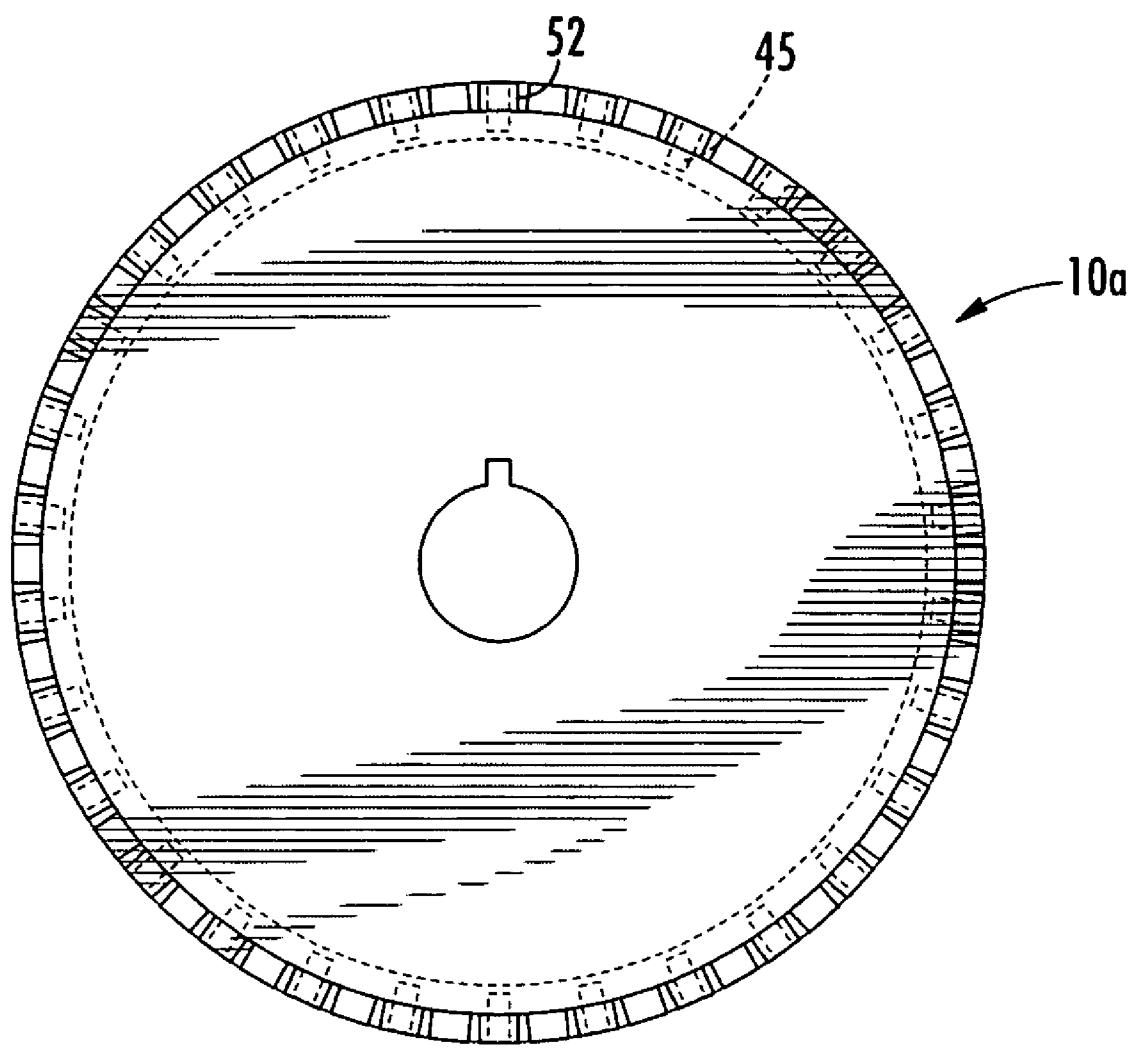
Figure 6:
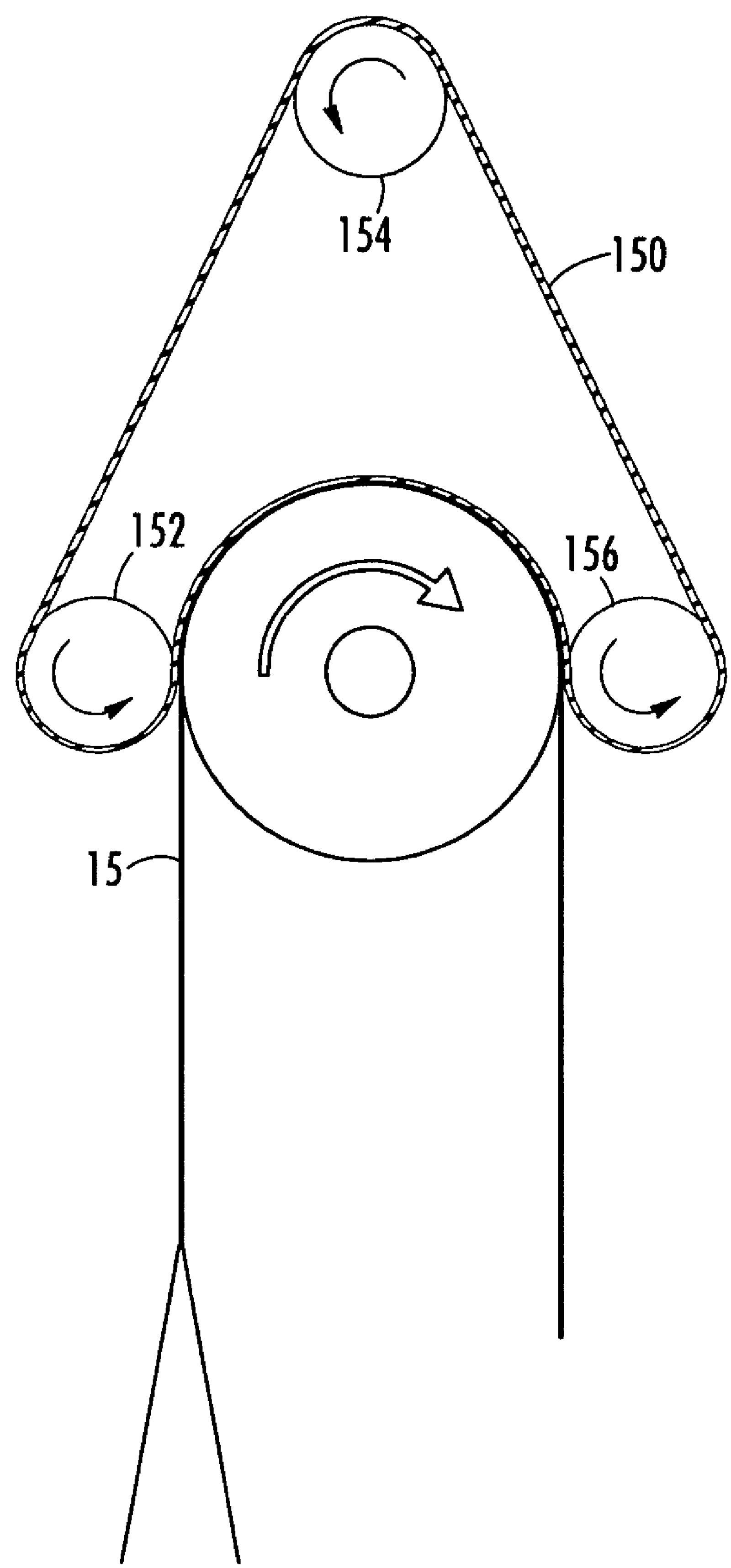
Figure 7:
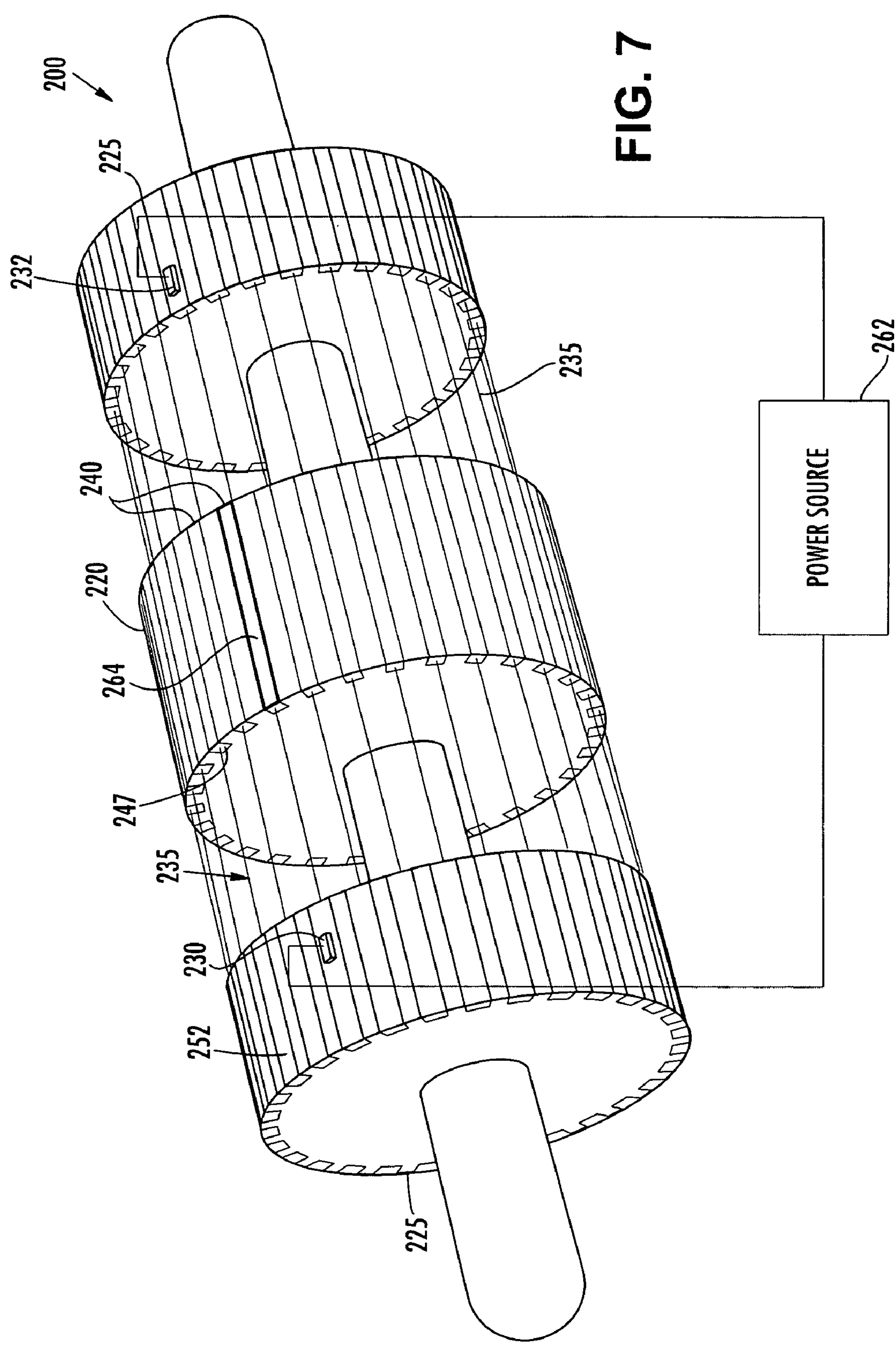

FIGS. 5*a* through 5*c* are side views of a rotary impulse sealer wherein the conductive member and the resistive member are in direct electrical contact with each other;

FIG. 6 is a side view of a rotary impulse sealer depicting a belt for maintaining pressure on the heat sealable material as it travels over the sealer; and FIG. 7 is a perspective view of a rotary impulse sealer that is useful for producing transverse seals in a heat sealable material.

DETAILED DESCRIPTION OF THE INVENTION

The invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The rotary impulse sealers illustrated in FIGS. 1 through 6 are particularly useful for producing a continuous running heat seal in the machine direction of travel. The term heat sealable material is used throughout this application to refer to materials that may comprise a tube, layers, sheets, and the like that can be bonded together with a heat seal. Such materials include, without limitation, films and laminates comprising thermoplastic and thermoset materials, substrates having heat sealable waxes and adhesives, and metalized films and poly-coated foils, such as poly-coated aluminum foil, and poly-coated paper, and the like. The rotary impulse sealer is in the form of a rotatable roll having a cooling zone and a heating zone that is stationary with respect to the rotation of the roll. Heat sealable materials traveling over the roll are fused together as they pass through the heating zone and are supported by the roll and allowed to cool on the roll after exiting the heating zone. The newly formed heat seal is supported by the roll until the melted material has sufficiently cooled to prevent seal rupture.

Figures 1A, 1B:
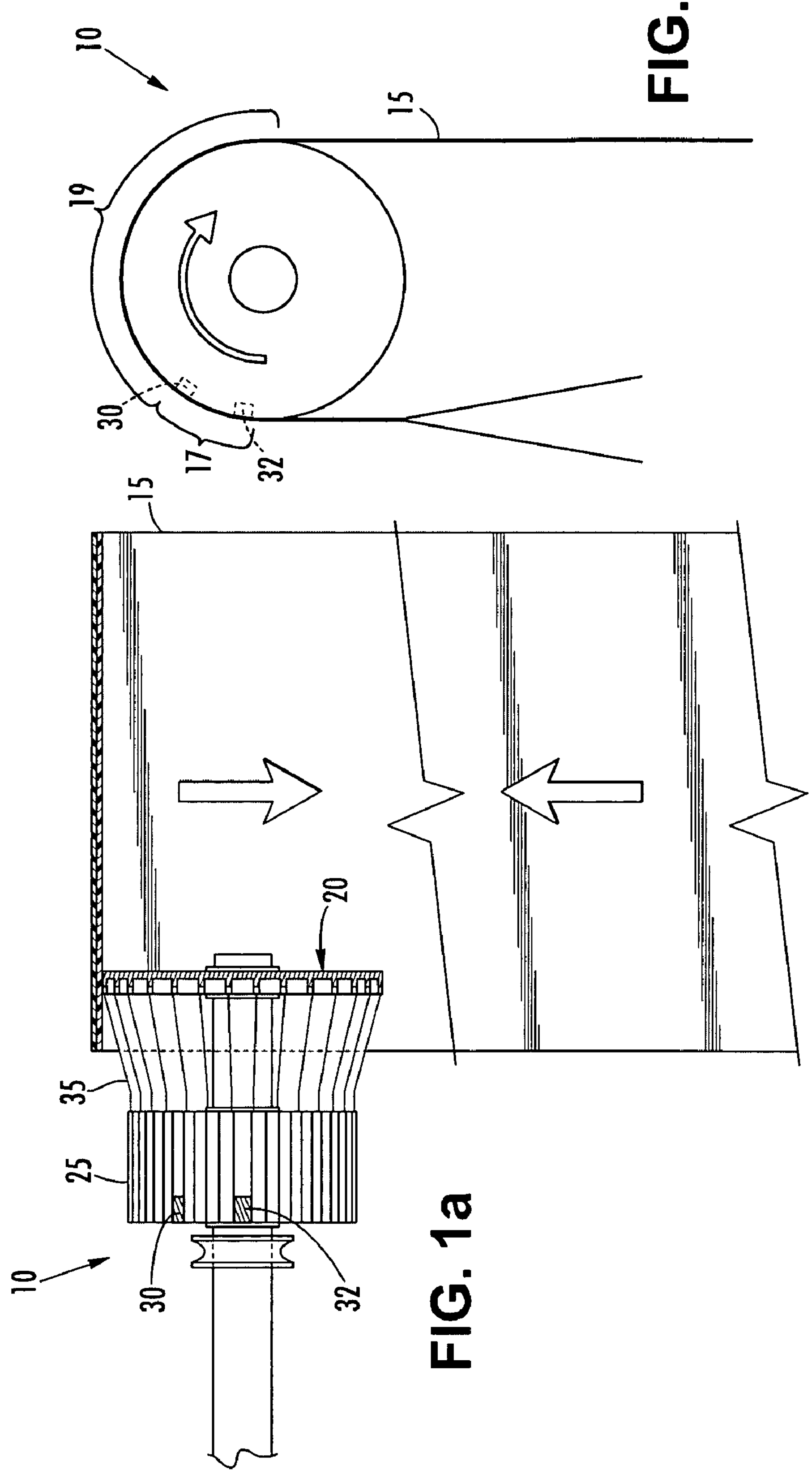

With reference to FIG. 1*a*, a rotary impulse sealer is illustrated and broadly designated as reference number 10. The rotary impulse sealer comprises a generally cylindrical roll having an electrically resistive zone 20 and an electrically conductive zone 25 in electrical communication with each other. Electric current is applied to the conductive zone via an electrical contact 30 and flows from the conductive zone into a corresponding section on the electrically resistive zone. Electrical current within the resistive zone is impeded by a greater degree of resistance resulting in the production of thermal energy. As shown in FIG. 1*a*, two sheets of heat sealable material 15 are traveling about the rotary impulse sealer in face-to-face contact with each other over the heated resistive zone 20 causing the areas of the heat sealable material adjacent to the heated resistive zone to melt and fuse together. After passing over the heating zone, the newly formed seal is supported by the surface of the roll in the cooling zone 19 (see FIG. 1*b*) until the seal has adequately cooled. FIG. 1*b* is a side perspective of the rotary impulse sealer 10 illustrating two separate material layers traveling about the roll and being fused together. As shown in FIG. 1*b*, an exemplary heating zone is illustrated by the brackets labeled with reference number 17, and the cooling zone is represented by the brackets labeled with reference number 19.

The electrical contact 30 may be in the form of a spring loaded contact, which is also commonly referred to as a "brush." Typically, the electrical contact comprises a carbon brush that is disposed in intimate sliding contact with the surface of the conductive zone. The electrical contact is typically in contact with a single conductive strip at any given time. However, it should be recognized that in some embodiments it may be desirable to have the electrical contact contacting multiple conductive strips simultaneously. Other methods of providing electric current include induction transfer such as through an inductive coil system, and radiation transmission.

Figure 2:
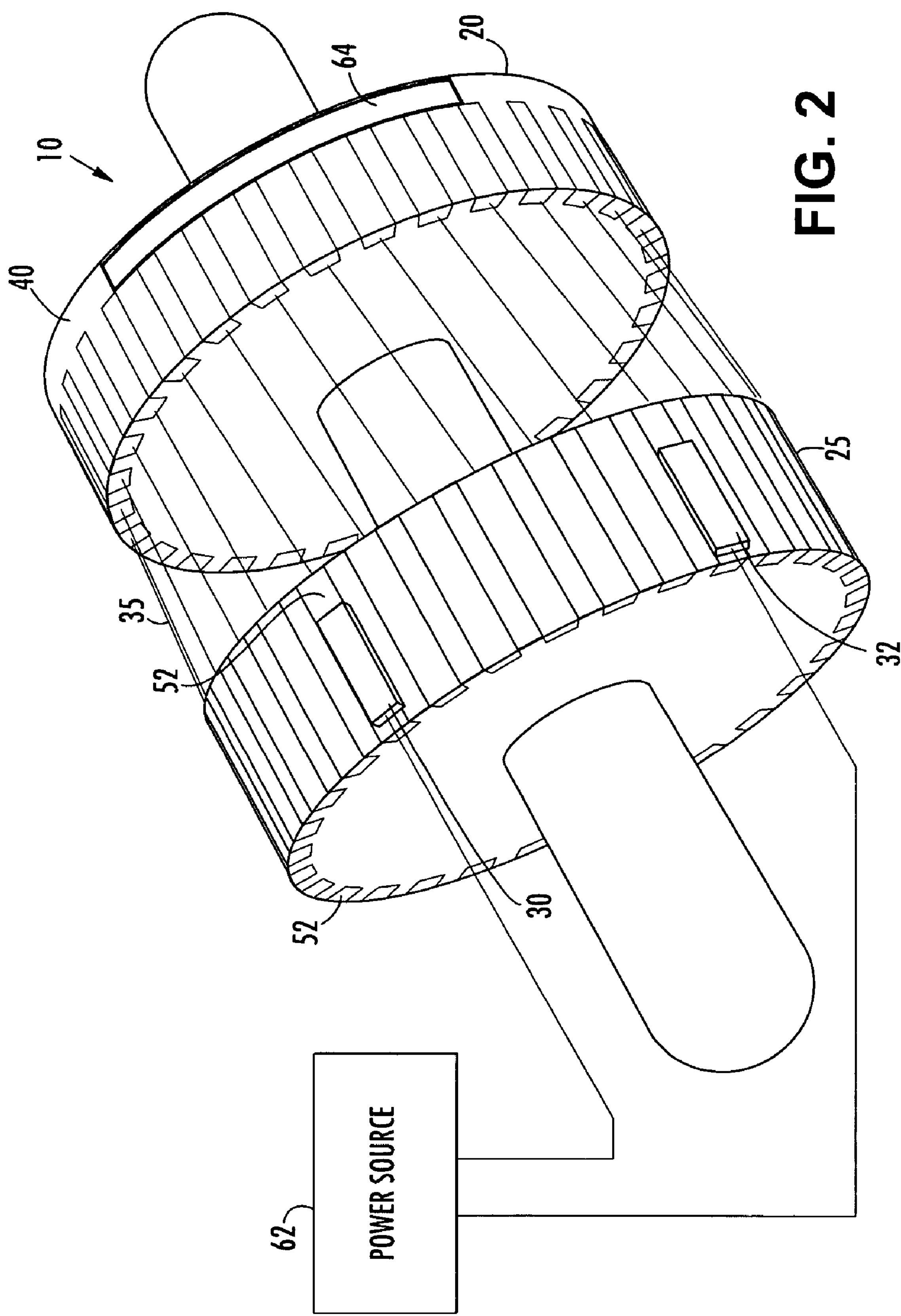
FIG. 2 is perspective view of a rotary impulse sealer depicting the a heating zone created by current flow through the resistive zone.

The rotary impulse sealer may also include an electrical ground contact 32, which may also be in the form of a spring loaded carbon brush. In some embodiments the electrical ground contact 32 is in mechanical and electrical communication with the conductive zone 25 to form a current path from the electrical contact 30 into the resistive zone and back to the electrical ground contact 32. As a result a "heating zone" is created within the resistive zone 20 that corresponds to the current pathway through the resistive zone. In this regard, FIG. 2 illustrates a heating zone 64 that is produced from current flow through the resistive zone. Electrical current is supplied from power source 62 to an electric contact 30 that is in electrical communication with the conductive zone 25. The electric contact and ground contact can be at different potentials and may be in electrical communication with an AC or DC power source. Suitable electric brushes include model number RM312A, which are available from Magnetek, Inc.

Although the figures illustrate the presence of a single electrical ground 32 for current flow back to the source 62, it should be recognized that more than one ground can be used to control current pathway. In resistive zone 20, the current will divide, a part passing through the short path between the electrical contact 30 and the ground 32, and the remainder part taking the long path about the circumference of the resistive zone. If desired, a second ground (not shown) can be positioned on the opposite side of the electrical contact 30 to prevent unwanted current travel about the circumference. However, it should be recognized that in some embodiments the amount of current taking the longer path should be minimal.

Electrical contact 30 may be disposed in a stationary position with respect to the rotation of the rotary impulse sealer 10. As the roll rotates, current is applied to the electrically conductive zone and passes into a section of the electrically resistive zone that is in electrical communication with the conductive zone to produce a hot zone. Continued rotation of the roll rotates the heated portion of the electrically resistive member out of electrical communication with electrical contact 30 and thereby out of the hot zone. The size of the hot zone can be increased or decreased by changing the position of the electrical ground contact 32 with respect to the position of electrical contact 30, and visa versa. The greater the distance between the electrical contact and the ground, the larger the hot zone.

As the heat sealable materials travels over the hot zone, the materials are melted and fused together to form a heat seal. After passing through the hot zone the heat sealed materials continue to be supported by the roll for a short distance. During this time the newly formed seal can adequately cool to form a strong seal that should not prematurely rupture or separate. If desired, the electric current can be switched on and off to produce a discontinuous seal.

In some embodiments, the electrically resistive and conductive zones may comprise separate members that are connected electrically, or electrically resistive and conductive members disposed on a single continuous surface or roll.

Figure 3:
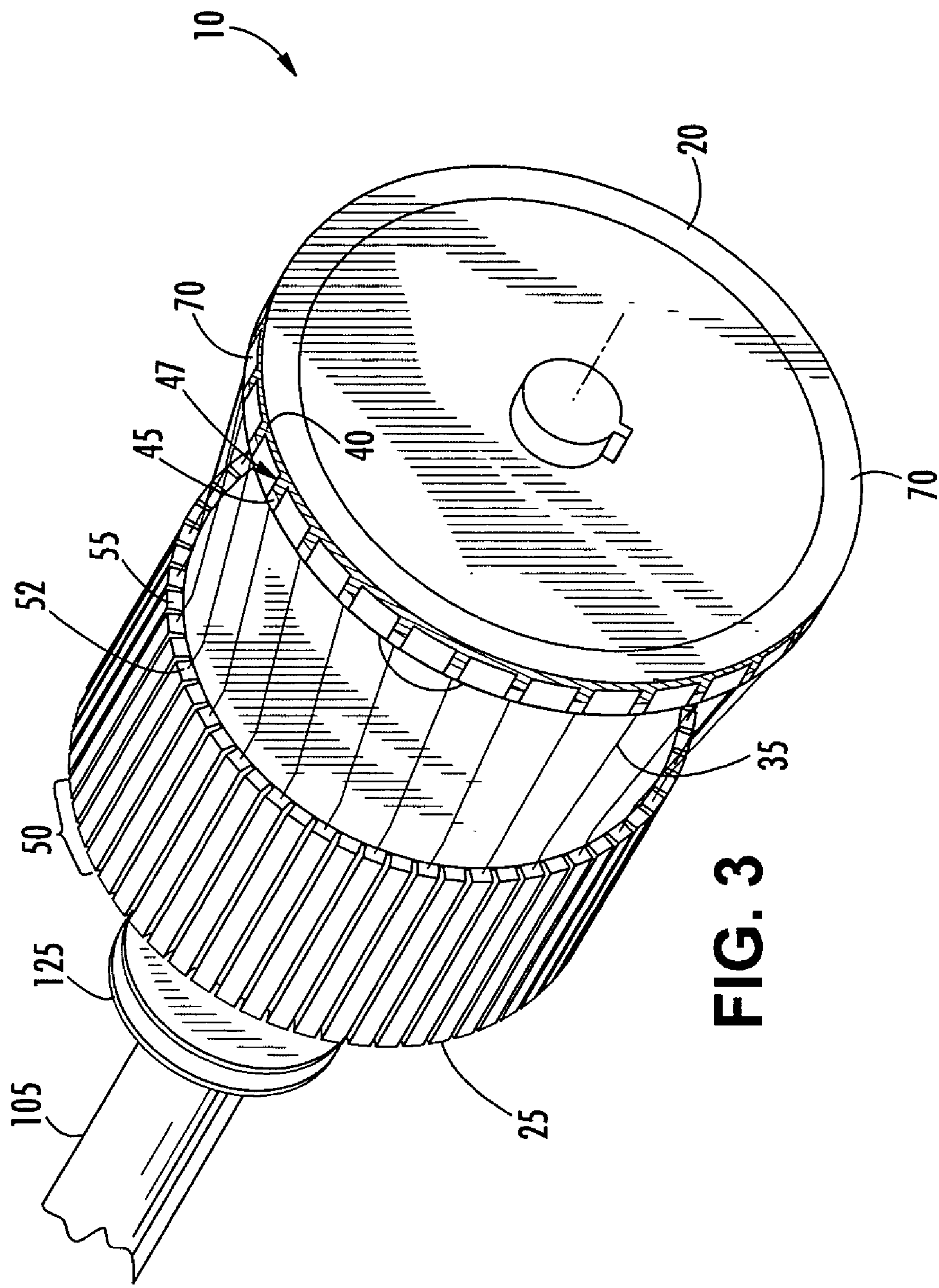
FIG. 3 is a perspective view of the rotary impulse sealer depicted in FIG. 1.
Figure 4:
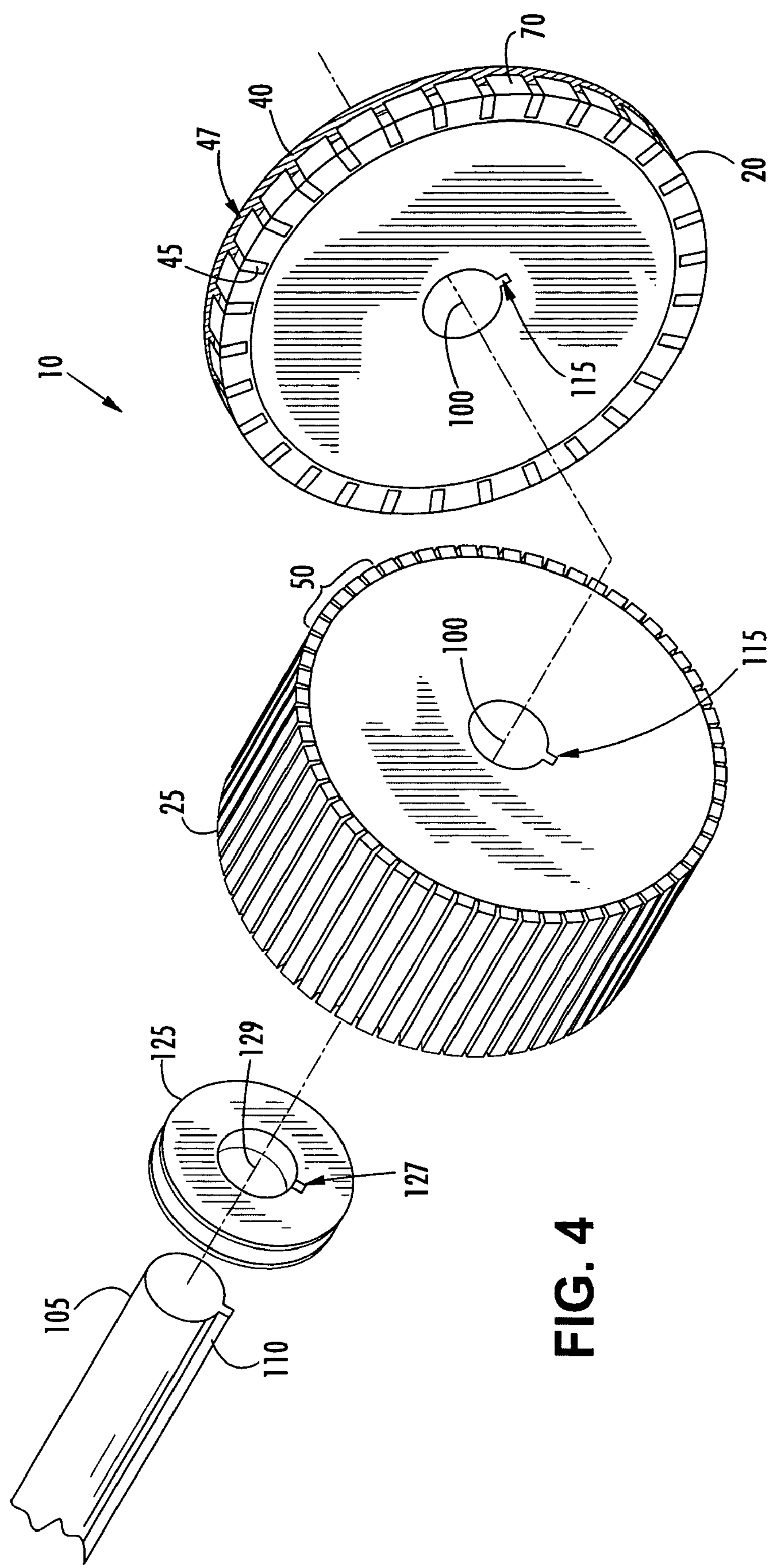
FIG. 4 is an exploded perspective of the rotary impulse sealer depicted in FIG. 3.

With reference to FIGS. 3 through 5, rotary impulse sealers having separate electrically resistive members and separate electrically conductive members are illustrated. FIGS. 3 and 4 illustrate an embodiment where the resistive member 20 and the conductive member 25 are in electrical communication via electrical connectors 35. Electrical connectors 35 form an electrical pathway between the conductive member and the resistive member. In one embodiment the electrical connectors are formed from wires, conductor inks, conductor pastes, conductor resins, copper plating, metallic strips, or equivalent substitute. The electrical connectors 35 may be attached to the conductive member 25 in a wide variety of ways including, but not limited to, solder welds, screws, pressure clips, or the like.

The electrically conductive member 25 may comprise a plurality of conductive strips extending laterally across its surface that are typically insulated from each other. As shown in FIG. 3, the conductive strips, which are collectively referred to as reference number 50 may comprise active strips 52 and inactive strips 55. Active strips 52 are in electrical communication with the resistive member via electrical connectors 35. Inactive strips help to maintain a substantially level surface for the electrical contact as it travels over surface of the conductive member. In an alternate embodiment, the inactive strips may comprise an electrically insulating material, such as polymeric or ceramic compositions, that fills the space between each successive active strip.

The conductive strips may comprise conductive materials including, but not limited to, copper, copper alloys, graphite, conductive epoxies, conductor inks, and the like. Typically, the conductive strips have minimal or low electrical resistance. In most embodiments the resistivity of the conductive strips may be less than the resistivity of the resistive material. In one embodiment, a commercially available commutator may be used as the conductive member. A commutator is a device that may be in the form of a cylinder and that has a plurality of individually insulated conductive strips. In some embodiments, the conductive strips may comprise conductor inks or resins that can be coated or printed onto the surface of the conductive member.

With reference to FIGS. 3 and 4, the electrically resistive member 20 comprises a generally cylindrical shaped disc having an electrically resistive material disposed on its surface. The surface 70 of the resistive member 20 comprises a material that electrically and thermally insulates the resistive material from the rest of the resistive member. The resistive material may comprise a resistive band 40 that encompasses the circumference of the resistive member. Although the general shape of the resistive member is normally cylindrical, it should be recognized that other shapes can be used such as a square, hexagon, or octagon.

The resistive band 40 may also include small projections or tabs 47 of resistive material that extend outwardly along the surface 70 to contact and overlap conductive tabs 45. The conductive tabs 45 provide a current pathway between the electrical connectors 35 and the resistive band 40. In the embodiment illustrated in FIGS. 3 and 4, electrical connectors are attached to the resistive member via conductive tabs 45. Current flows from the electrical connectors 35 through the conductive tabs 45 and into resistive tabs 47 and then travels into the resistive band 40. The resistive tabs 47 may help prevent undesirable current flow into electrical conductive tabs 45 that are disposed between the electric contact and the ground contact. The conductive tabs 45 may comprise a variety of different materials that are electrically conductive and have low resistance, such as copper, conductive epoxies, conductor inks, and the like. The conductive tabs 45 can be attached to the surface 70 in a wide variety of ways including, for example, with an adhesive, printing methods, soldering, and the like. The electrical connectors 35 may be attached to the conductive tabs 45 in a wide variety of ways including, but not limited to, solder welds, screws, pressure clips, clamping, plating, or the like.

A variety of different materials can be used as the resistive material including, but not limited to, metallic alloys such as nichrome, molybdenum, iron chrome aluminum, $MoSi_2$, thick and thin resistor films including resistor inks, pastes, and resins. Resistor inks and resins are particularly useful in the practice of the invention. Resistor inks are well known in the field of electronic devices. The resistor inks can be applied by screen printing, stenciling or any other technique capable of depositing a controlled amount of ink on the surface of the resistive member. Resistor inks are particularly useful because they can be printed onto the surface in desired patterns, and can then be fired so that they become part of the surface. Additional benefits of resistor inks include being able to be applied in a relatively thin layers, for example, from about 0.0002 to 0.0016 of an inch thick; low mass resulting in a quick heat-up and low thermal expansion; and the ability to withstand high temperatures. Resistor inks and resins are also useful because they allow for a simple method of fabricating the resistive material on the surface of the resistive member. A suitable resistor ink is ESL Series 3100 available from Electro-Science Laboratories.

Resistor inks may be in the form of an emulsion that can be printed or sprayed directly onto the surface, or a thick paste that is coated onto the surface 70 of the resistive member 20. Resistor inks typically comprise a glass frit, high resistivity oxide particles such as ruthenium oxide, and an organic vehicle. The resistor inks can be specially formulated so that the final fired composition will have a predetermined resistivity or a preselected temperature coefficient of resistance. Temperature coefficient of resistance is defined as the amount of change of the resistance of a material for a given change in temperature.

In some embodiments, the resistive material may comprise a release agent or coating that may be applied to the surface of the material, or that can be incorporated into the resistive material itself. The resistor inks, pastes, or resins may also comprise ceramic materials and/or release agents that can help prevent the heat sealable materials from sticking or adhering to the surface of the resistive band 40. As a result, tearing or separation of the seal can be substantially reduced. In embodiments where a metallic alloy such as nichrome is used as the resistive material it may be necessary to apply a release agent or coating such as Teflon, silicone, or glass coating to prevent unwanted adherence of the heat sealable material to the resistive element. In embodiments designed to fuse conductive heat sealable materials together, such as metalized film or poly-coated aluminum foil, the resistive material may also comprise a non-conductive insulating material such as a glass overcoating or similar material. In these embodiments it may also be desirable to coat the conductive member and/or electrical connectors with a non-conductive insulating material.

It should be recognized that the resistivity of the resistive material depends upon many factors such as the thickness of the resistive material, current, composition, and the like. Additionally, it should also be recognized that a resistive material can be selected based on its resistivity and the particular application of its intended use. The temperature coefficient of resistance (TCR) of the resistive material may be used as a means for actively or passively controlling and monitoring the temperature of the heating zone. Depending upon intended use or application, the resistive material can be chosen to have a desired TCR.

The surface 70 of the resistive member typically comprises a material that thermally and electrically insulates the resistive material. The surface 70 may comprise an outer surface layer having a thickness that typically extends beyond the length of the conductive tabs 45, or alternatively, may comprise a coating adhered to the resistive member. Ceramic materials are particularly useful because of their ability as electrical and thermal insulators. A particularly useful ceramic material is Macor®, which is available from Corning Inc., of Corning, N.Y. Cordierite is another material that may be useful as a surface material.

In an alternate embodiment, the resistive member 20 and the conductive member 25 may be disposed in intimate contact with each other without the use of electrical connectors 35. In this regard, FIGS. 5*a* through 5*c* illustrate a side perspective of a resistive member and a conductive member that have been brought into close proximity with each other. FIG. 5*a* is a side perspective of the conductive member. FIG. 5*b* is a side perspective of the resistive element illustrating the conductive tabs 45 extending downwardly from the outer circumference surface. FIG. 5*c* is an illustration depicting the resistive member 20 and the conductive member aligned with each other. Active conducting strips 52 are aligned with, and in electrical communication with the conductive tab 45 on the resistive member. As a result, current can flow directly from the conductive member into the resistive member. Typically a spring clamp or other mechanism may be used to apply pressure to the conductive and resistive members to maintain electrical contact between the members.

As discussed above, the rotary impulse sealer in some embodiments may also comprise a continuous surface having both a resistive zone and a conductive zone disposed thereon. Similar to the embodiments described above, the rotary impulse sealer having a continuous surface may have a resistive band comprising a resistive material that is in electrical communication with a plurality of conductive strips.

The overall size and orientation of the conductive member with respect to the resistive member may vary depending upon design preference. In some embodiments, the conductive zone may have a diameter that is the same or larger than the resistive member. Additionally, in some embodiments the orientation of the conductive zone with respect to the position of the heat sealable material can be switched 180 degrees so that the heat sealable material would pass over the conductive member as it is driven about the resistive member. In this embodiment, it may be useful to position the electrical and ground contacts about 180 degrees off the apex of heat sealable material travel about the roll. It should be noted that the positions of the electrical contact and ground contact does not have to be aligned with the activated conductive strips and can be skewed so that the contacts do not interfere with travel of the heat sealable material about the roll. The diameter and width of the resistive member can also be varied depending upon the particular sealing application. For example, the width of the resistive member can be increased to provide a larger heat seal. The shape of both the conductive member and the resistive member can individually or jointly be varied. Typically, roll has a generally cylindrical shape. However, in some embodiments the roll as a whole, or its individual members, may have other shapes such as, for example, a square, hexagon, or octagon.

The rotary impulse sealer may be motor driven or product driven. With reference to FIGS. 3 and 4, a motor driven device is illustrated. The rotary impulse sealer may also comprise a shaft 105 about which the resistive member 20 and the conductive member 25 are disposed. The resistive and conductive members each have a central passageway 100 through which the shaft 105 can be inserted. Retaining rings or other clamping devices can be used to positionally secure the resistive and conductive members on the shaft. A motor driven rotary impulse sealer typically includes a pulley 125 or sprocket that is in mechanical communication with a motor (not shown). As shown in FIG. 4, the pulley 125 may include a central passageway 129 for receiving the shaft 105. The central passageway can contain a slot 127 for lockingly engaging the shaft so that rotation of the pulley will also rotate the shaft. The pulley can be positionally secured to the shaft in a variety of different ways including, for example, retaining rings, set screws, bolts, and the like.

The resistive and conductive members are usually rotatably fixed or secured to the shaft 105 so that rotation of the shaft will also rotate the resistive member 20 and conductive members 25. The resistive and conductive members and shaft can be keyed (see 115 and 110) so that rotation of the resistive and conductive members is fixed relative to the shaft. FIG. 4 illustrates that the shaft 105 can be include a key 110. A corresponding slot 115 for fixedly receiving the key is shown as being present in the central passageways 100 through which the shaft 105 can be inserted. As a result, rotation of the shaft also rotates the resistive and conductive members. It should be recognized the type of key used and its placement could be varied depending upon the designer's particular preference, and that other methods could be used to rotatably fix the resistive and conductive members to the shaft.

In other embodiments, travel of the heat sealable material over the roll may be used to rotate the conductive and resistive members. In one embodiment the shaft and both the resistive and conductive members may be rotatable about one or more idler bearings so that travel over the roll rotates the entire assembly. In another embodiment, the shaft may be stationary and travel of the heat sealable material over the rotary impulse sealer 10 may be used to rotate the resistive member 20 and conductive member 25. In this embodiment, the central passageway 100 may typically include one or more friction reducing members that allows the members 20, 25 to rotate freely about the shaft 105. Travel over the roll 10 causes the members 20, 25 to rotate about the shaft in the direction of heat sealable material travel. Suitable friction reducing members include bearings such as an idler bearing. The bearings can comprise a wide variety of materials including, but not limited to stainless steel, ceramic, aluminum, plastic, metallic alloys such as bronze, and the like. It should be recognized that other methods such as packed grease, for example, could be used to facilitate rotation of the resistive member and conductive member about the shaft, although not necessarily with equivalent results.

The rotary impulse sealer may also be used in conjunction with a pressure belt. In this regard, FIG. 6 illustrates a pressure belt 150 for maintaining sealing pressure between the sheets of heat sealable material and the heated surface of the sealer. The pressure belt typically comprises a resilient material that is capable of withstanding high temperatures that may be generated by the heating zone. In some embodiments, the belt may include a release or surfacing agent, such as Teflon or silicone, to reduce adhesion of the heat sealable material to the belt. Pulleys 152, 154, 156 work in conjunction to drive belt 150 in the same direction that the heat sealable material is travelling. In an alternative embodiment, one or more pressure rolls could be used to apply sealing pressure to the heat sealable material as it travels over the heating zone. In this embodiment, a first pressure roll could be disposed adjacent to the point at which the heat sealable material contacts the heating zone and a second pressure roll could be disposed adjacent to the point at which the heat sealable material exits the heating zone.

In an alternate embodiment, the rotary impulse sealer may also be used for performing transverse heat seals. With reference to FIG. 7, a rotary impulse sealer for performing transverse seals is illustrated and broadly designated as reference number 200. The transverse rotary impulse sealer comprises a resistive zone 220 (resistive member) disposed between two electrically conductive zones 225 (conductive members). The resistive member 220 comprises a plurality of resistive strips 240 that are thermally and electrically insulated from the roll 200 and from each other. Current supplied from power source 262 passes through electrical contact 230 and returns via ground contact 232. Current passes through electric contact 230 into conductive strips 252 and through electrical connectors 235 and into electrically resistive strips 240 that extend transversely across the surface of the electrically resistive zone (resistive member) As current passes through the resistive member, resistive material 240 is heated to create a heating zone. Resistive strip 264 represents a heated strip for producing a transverse heat seal. The resistive member 220 may include conductive tabs 247 for attaching the electrical connectors 235. It should be recognized that the conductive members and the resistive member could also be disposed on a continuous roll or be attached directly to one another. In an alternate embodiment, the first and second conductive members can be disposed adjacent to each other, or on the same side of the resistive member.

In another embodiment the transverse rotary impulse seal may comprise a single conductive member and a resistive member. In this embodiment, the resistive strips could be in the shape of a "U" or other shape so that the current would flow across the resistive strips and then flow back to the conductive member.

The width and distance between the transverse heat seals can be controlled or adjusted by changing several parameters associated with the heat seals. For instance, the spacing between heat seals can be changed by increasing or decreasing the amount of resistive strips 240 that are disposed on the resistive member. Additionally, the current can also be cycled on and off for a given period of time as the heat sealable material continues to be driven forward. As a result, a predetermined amount of heat sealable material can be driven forward without creating a heat seal. The width of the heat seal can be increased or decreased by altering the size of the brushes, resistive strips, or a combination of both.

During operation, the amount of heat produced by the resistive zone is typically dependent upon the resistance of the particular resistive material used and the amount of current applied to the device. As such, it should be apparent that the degree of melting or amount of heat applied to the heat sealable materials can be controlled by varying the amount of current applied to the rotary impulse sealer. For instance, for thicker materials it may be necessary to increase the current level so that the resistive zone produces heat sufficient to melt and fuse the materials together. In the same manner, the current level could also be used to vary the strength of the seal. Alternatively, the degree of melting can also be controlled by changing the dwell time to which the heat sealable materials are exposed to the hot zone.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A rotary impulse sealer for sealing of heat sealable materials comprising:

a) a rotatable roll having at least one cooling zone and at least one heating zone, said heating zone comprising at least a portion of a resistive zone in electrical communication with at least one conductive zone; and b) a current source in electrical communication with said conductive zone, said heating zone defined by current flowing from said current source, through said conductive zone, and into at least a portion of the resistive zone, and said cooling zone comprising a previously heated portion of said resistive zone as a result of current no longer flowing from said conductive zone, whereby travel of a heat sealable material over said heating zone causes the formation of a heat seal and travel over said cooling zone allows the thusly formed seal to cool in a supported state.

2. The rotary impulse sealer according to claim 1, wherein said resistive zone comprises a band of resistive material disposed circumferentially about said roll.

3. The rotary impulse sealer according to claim 2, wherein said resistive material comprises nichrome, molybdenum, iron chrome, aluminum, $MoSi_2$, resistor inks, resistor pastes, or resistor resins.

4. The rotary impulse sealer according to claim 2, wherein the resistive material further comprises a release agent.

5. The rotary impulse sealer according to claim 2, further comprising a non-conductive insulating material disposed on said resistive material.

6. The rotary impulse sealer according to claim 1, wherein said resistive zone comprises an insulated surface have a plurality of electrically resistive strips extending laterally across said surface, said resistive strips are in electrical communication with said conductive zone, and wherein said resistive strips comprise nichrome, molybdenum, iron chrome, aluminum, $MoSi_2$, resistor inks, resistor pastes, or resistor resins.

7. The rotary impulse sealer according to claim 1, wherein said conductive zone comprises a plurality of conductive strips extending laterally across said roll.

8. The rotary impulse sealer according to claim 1, wherein said roll includes an outer surface comprising an electrically insulated and thermally insulated material.

9. The rotary impulse sealer according to claim 1, wherein said roll is disposed about a driven shaft, and wherein said shaft is rotatably driven by a motor and rotation of said roll is fixed relative to the rotation of said shaft, whereby rotation of said shaft rotates said roll.

10. The rotary impulse sealer according to claims 9, wherein said current source is stationary relative to the rotation of said roll.

11. The rotary impulse sealer according to claim 1, wherein said roll is rotatably disposed about a shaft and further comprises at least one idler bearing disposed between said shaft and said roll, whereby travel of heat sealable material over said roll causes said roll to rotate about said shaft in the direction of heat sealable material travel.

12. The rotary impulse sealer according to claim 1, wherein the current source comprises a carbon brush in electrical communication with a power source.

13. The rotary impulse sealer according to claim 1, further comprising at least one electrical ground in communication with said conductive zone.

14. The rotary impulse sealer according to claim 13, wherein said heating zone is defined by current flow from said current source through said resistive zone to said electrical ground.

15. The rotary impulse sealer according to claim 1, further comprising a pressure belt disposed adjacent to said resistive zone, whereby said belt applies sealing pressure to heat sealable material traveling between said belt and said resistive zone.

16. The rotary impulse sealer according to claim 1, further comprising at least one pressure roll disposed adjacent to said resistive zone, whereby said pressure roll applies sealing pressure to heat sealable material traveling between said pressure roll and said resistive zone.

17. The rotary impulse sealer according to claim 1, wherein the roll comprises a generally cylindrical shape.

18. An impulse seal roll comprising:

a) a rotatable cylindrical resistive member having an insulated surface and a resistive material disposed thereon;

b) a rotatable cylindrical conductive member in electrical communication with said resistive material, said conductive member having a plurality of electrically conductive strips extending laterally across the surface of said conductive member; and c) at least one electrical contact in electrical communication with at least one of said electrically conductive strips whereby current flows from said electrical contact, through said conductive zone, and into said resistive material.

19. The impulse seal roll according to claim 18, wherein the resistive member comprises a heating zone and a cooling zone, said heating zone defined by current flow through said resistive member, and said cooling zone defined by the absence of a heating zone.

20. The impulse seal roll according to claim 18, wherein said resistive material comprises a circumferential band disposed about said resistive member.

21. The impulse seal roll according to claim 18, wherein said insulated surface comprises ceramic.

22. The impulse seal roll according to claim 18, wherein said resistive material comprises nichrome, molybdenum, iron chrome, aluminum, $MoSi_2$, resistor inks, resistor pastes, or resistor resins.

23. The impulse seal roll according to claim 18, wherein said electrically resistive material is printed on the surface of said resistive member.

24. The impulse seal roll according to claim 18, wherein said electrically conductive strips comprise copper, graphite, conductive ink, or conductive epoxies.

25. The impulse seal roll according to claim 18, wherein said conductive member comprises a commutator.

26. The impulse seal roll according to claim 18, wherein said electrical contact comprises a carbon brush.

27. The impulse seal roll according to claim 18, wherein the resistivity of said conductive strips is less than the resistivity of said resistive material.

28. The impulse seal roll according to claim 18, wherein said resistive member and said conductive member are disposed on a continuous surface.

29. A transverse rotary impulse sealer comprising:

a) first and second rotatable cylindrical conductive members each having a plurality of electrically conductive strips extending laterally across the surface of said conductive members;

b) a rotatable cylindrical resistive member disposed between said first and second conductive members, said resistive member having a heating zone, cooling zone an insulated surface, and a plurality of electrically resistive strips extending laterally across the surface of said resistive member, wherein said resistive strips are in electrical communication with said first and second conductive members; and c) an electrical contact in electrical communication with said first conductive member and a ground contact in electrical communication with said second conductive member, wherein said heating zone is defined by current flow from said electric contact to said ground contact.

30. A transverse impulse seal roll according to claim 29, further comprising a driven shaft about which said resistive member and said first and second conductive member are disposed.

31. A transverse impulse seal roll according to claim 30, wherein said shaft includes a pulley for rotatably driving said resistive member and said conductive member.

32. A transverse impulse seal roll according to claim 29, wherein said conductive strips comprise copper, conductive epoxies, graphite, or conductor inks.

33. A transverse impulse seal roll according to claim 29, wherein said insulated surface comprises ceramic.

34. A transverse impulse seal roll according to claim 29, wherein said resistive strips comprise nichrome, molybdenum, iron chrome, aluminum, $MoSi_2$, resistor inks, resistor pastes, or resistor resins.

35. A method of performing a heat seal comprising:

a. providing a rotary impulse sealer according to claim 1;

b. applying current to said electrical contact;

c. passing heat sealable materials that are in face-to-face contact over the surface of the heating zone to produce a heat seal; and d. supporting said heat sealable materials in a cooling zone.

36. A method according to claim 35, further comprising the step of switching the current on and off to produce a discontinuous heat seal.

* * * * *